United States Patent
Kung et al.

(10) Patent No.: US 10,635,626 B1
(45) Date of Patent: Apr. 28, 2020

(54) CONNECTING METHOD AND DOCKING STATION FOR CONNECTING ELECTRONIC DEVICE AND COMPUTER

(71) Applicant: I/O INTERCONNECT, LTD., Santa Ana, CA (US)

(72) Inventors: Gary Kung, Santa Ana, CA (US); Ping-Shun Zeung, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 0 days.

(21) Appl. No.: 16/264,902

(22) Filed: Feb. 1, 2019

(51) Int. Cl.
*G06F 13/40* (2006.01)
*G06F 13/42* (2006.01)
*H04W 4/80* (2018.01)
*H04W 76/10* (2018.01)
*H04L 29/12* (2006.01)
*H04W 84/12* (2009.01)

(52) U.S. Cl.
CPC ...... *G06F 13/4081* (2013.01); *G06F 13/4282* (2013.01); *H04L 61/6022* (2013.01); *H04W 4/80* (2018.02); *H04W 76/10* (2018.02); *G06F 2213/0042* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 2008/0062939 A1* | 3/2008 | Horn | H04W 74/06 370/338 |
| 2011/0098087 A1* | 4/2011 | Tseng | G01C 21/265 455/557 |
| 2012/0265913 A1* | 10/2012 | Suumaki | H04W 4/08 710/303 |
| 2014/0259136 A1* | 9/2014 | Levy | H04L 63/0876 726/7 |
| 2016/0095145 A1* | 3/2016 | Gupta | H04W 8/005 455/41.2 |
| 2016/0285299 A1* | 9/2016 | Amand | H02J 7/025 |
| 2017/0220490 A1* | 8/2017 | Tan | G06F 13/102 |
| 2017/0264359 A1* | 9/2017 | Bernsen | H04W 76/14 |
| 2018/0020147 A1* | 1/2018 | Page | H04N 7/185 |
| 2018/0098366 A1* | 4/2018 | Cohn | H04W 76/14 |
| 2018/0190627 A1* | 7/2018 | Ting | H01L 33/382 |

* cited by examiner

*Primary Examiner* — Raymond N Phan
(74) *Attorney, Agent, or Firm* — Tim Tingkang Xia, Esq.; Locke Lord LLP

(57) ABSTRACT

A connecting method includes the following operations: storing a plurality of MAC addresses by a memory of a docking station; determining a first MAC address of the plurality of MAC addresses by a processor of a docking station, wherein the first MAC address is corresponding to a first electronic device of the plurality of electronic device; establishing a BLUETOOTH connection between the first electronic device and the docking station by the processor; establishing a USB connection or Bluetooth connection between the docking station and a computer by the processor; and pairing the computer and the first electronic device through the docking station.

20 Claims, 3 Drawing Sheets

CONNECTING METHOD AND DOCKING STATION FOR CONNECTING ELECTRONIC DEVICE AND COMPUTER

FIELD OF INVENTION

The invention relates to a connecting method and a docking station. More particularly, the invention relates to a connecting method and a docking station for wireless connection by BLUETOOTH, USB, and Wi-Fi between a docking station, an electronic device, and a computer.

BACKGROUND

Computer docking station usually provides USB port, HDMI, Ethernet, USB type-c power delivery capability, etc. with wireless charging pad and a Bluetooth circuit. In some cases, the phone and the docking station are connected through the BLE (Bluetooth), and the docking station and the computer are connected through the USB and/or the Bluetooth connection. The computer and the phone are paired through the docking station so as to transmit information or back up data through the WIFI.

Sometimes, the computer may pair with more than one phone through the same docking station. In this situation, how to let the users switch the phones paired to the computer through the docking station easily is a problem to be improved in the art.

SUMMARY

An embodiment of this disclosure is to provide a connecting method. The connecting method includes the following operations: storing a plurality of MAC addresses by a memory of a docking station; determining a first MAC address of the plurality of MAC addresses by a processor of a docking station, wherein the first MAC address is corresponding to a first electronic device of the plurality of electronic device; establishing a BLUETOOTH connection between the first electronic device and the docking station by the processor; establishing a USB connection or Bluetooth connection between the docking station and a computer by the processor; and pairing the computer and the first electronic device through the docking station.

An embodiment of this disclosure is to provide a docking station. The docking station includes a memory, a processor, a first communication circuit, and a second communication circuit. The memory is configured to store a plurality of MAC addresses, wherein the plurality of MAC addresses correspond to a plurality of electronic device. The processor is configured to determine a first MAC address of the plurality of MAC addresses, wherein the first MAC address is corresponding to a first electronic device of the plurality of electronic devices. The first communication circuit configured to establish a BLUETOOTH connection between the first electronic device and the docking station. The second communication circuit configured to establish a USB connection or Bluetooth connection between the docking station and a computer. The computer and the first electronic device are paired through the docking station.

The embodiment of the present disclosure is to provide a connecting method and a docking station, since the MAC addresses corresponding to the electronic devices are stored in the memory, the connection between the docking station and the electronic device may be established faster, and further to establish the WIFI connection between the computer and the electronic devise faster. Furthermore, the docking station or the computer may further check whether the electronic device, which is connected to the docking station by now is charging wirelessly by the docking station, so as to assure that the found MAC address is in correspondence to the electronic device placed on the docking station, instead of other electronic devices which are placed near the docking station 100 and are not being charged wirelessly by the docking station.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
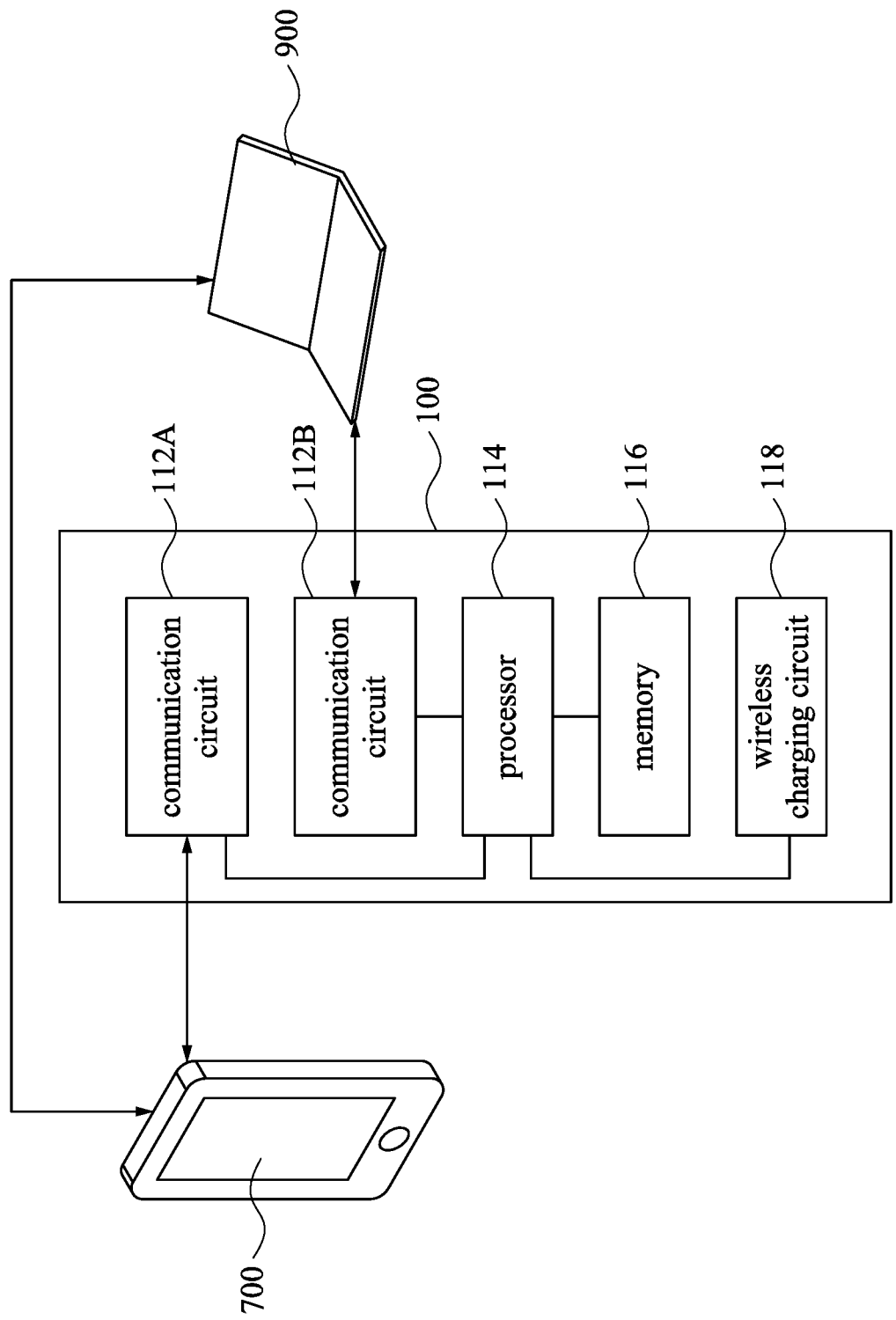
FIG. 1 is a schematic diagram illustrating a docking station according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the recent disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a docking station 100 according to some embodiments of the present disclosure. As illustrated in FIG. 1, the docking station 100 includes communication circuits 112A, 112B, processor 114, and memory 116. The docking station 100 shown in FIG. 1 is for illustrative purposes only and the present disclosure is not limited thereto.

In the connection relationship, the communication circuits 112A, 112B, and the memory 116 couples to the processor 114 respectively. The memory 116 is configured to store several MAC addresses. Each of the MAC addresses corresponds to an electronic device. To be more detailed, the first MAC address corresponds to a first electronic device, the second MAC address corresponds to a second electronic device, and so on.

In the operational relationship, if the user wants to update data from the electronic device 700 to the computer 900, the processor 114 determines the MAC address corresponds to the electronic device 700. The communication circuit 112A is configured to establish a BLUETOOTH connection between the electronic device 700 and the docking station 100. The communication circuit 112B is configured to establish a USB connection or Bluetooth connection between the docking station 100 and a computer 900. The computer 900 and the electronic device 700 are then paired through the docking station 100, so that the computer 900 and the electronic device 700 may transmit data to each other through the WIFI connection between the computer 900 and the electronic device 700.

In some embodiments, the docking station 100 further includes a wireless charging circuit 118. When the electronic device 700 is placed on the docking station 100, the wireless charging circuit 118 charges the electronic device 700 wirelessly.

In some embodiments, the processor 114 is configured to advertise the MAC addresses stored in the memory 116 alternatively. The processor 114 is further configured to determine whether the docking station 100 is connected with the electronic device 700 through the first MAC address when the first MAC address is advertised. In some embodiments, if the electronic device 700 is connected with the docking station 100 through the first MAC address, the processor 114 determines that the first MAC address is the MAC address that paired with the electronic device 700.

In some embodiments, the processor 114 is further configured to determine whether the electronic device 700 is wirelessly charged by the docking station 100. In some embodiments, the processor 114 starts advertising the MAC addresses stored in the memory 116 when a wireless charging circuit 118 is wirelessly charging the electronic device 700. In some embodiments, when the electronic device 700, which has paired to the computer 900 before, is placed on the docking station 100, the computer 900 transmits a triggering message to the docking station 100. When the docking station 100 receives the triggering message, the processor 114 starts advertising the MAC addresses stored in the memory 116.

For example, assume that the computer 900 has paired with 5 different electronic devices through the docking station 100 before. Each of the electronic devices is paired with a MAC address, in which the electronic device corresponds to the second MAC address. The memory 116 stores the five different MAC addresses; each corresponds to one of the electronic devices. It should be noted that the number of the MAC addresses mentioning above are for illustrative purposes only, and the embodiments are not limited thereto.

When the electronic device 700 is placed on the docking station 100, the wireless charging circuit 118 charges the electronic device 700 wirelessly, and the computer 900 transmits a triggering message to the docking station 100. The processor 114 then starts advertising the MAC addresses stored in the memory 116 alternatively. Since the electronic device 700 is corresponding to the second MAC address, when the first MAC address is advertised, the electronic device 700 is not connected to the docking station 100. The processor 114 then advertises the second MAC address. Since the electronic device 700 is corresponding to the second MAC address, when the second MAC address is advertised, the electronic device 700 is connected to the docking station 100 through the second MAC address. A Bluetooth connection is then established between the electronic device 700 and the docking station 100. The electronic device 700 transmits the charging status of the electronic device 700 to the computer 900 through the Bluetooth connection between the electronic device 700 and the docking station 100 and the USB connection or Bluetooth connection between the docking station 100 and the computer 900.

If the charging status of the electronic device 700 transmitted to the computer 900 shows that the electronic device 700 is being charged by now, the computer 900 or the processor 114 determines that the second MAC address is the one that paired with the electronic device 700, which is placed on the docking station 100 by now.

When the MAC address which paired with the electronic device 700 is determined, then, a WIFI IP of the computer 900 and a WIFI IP of the electronic device 700 is transmitted through the communication circuits 112A and 112B. Then, a WIFI connection between the computer 900 and the electronic device 700 is established, so that the computer 900 and the electronic device 700 may transfer messages or data to and from each other.

In some embodiments, the MAC addresses are assigned by the computer 900. For example, when the electronic device 700 is paired to the computer 900 by the first time, the computer 900 assigned a MAC address corresponding to the electronic device 700. Then, the computer 900 sends the MAC address corresponding to the electronic device 700 to the docking station 100 through the communication circuit 112B, and the processor 114 stores the MAC address in the memory 116.

It may be known from the above, in the embodiments of the present disclosure, the application of the docking station 100 stores the MAC address corresponding to the electronic device, whenever an electronic device, which has paired with the computer 900 before, is intended to connect to the computer 900 through the docking station 100. The processor 116 may advertise the MAC addresses stored in the memory 116 alternatively, so as to determine the MAC address corresponding to the electronic device 700. Since the MAC address is stored in the memory 116, the connection between the docking station 100 and the electronic device 700 may be established faster. Furthermore, the processor 116 or the computer 900 may further check whether the electronic device 700, which is connected to the docking station 100 by now is charging wirelessly by the docking station 100, so as to assure that the found MAC address is in correspondence to the electronic device 700 placed on the docking station 100, instead of other electronic devices which are placed near the docking station 100 and are not being charged wirelessly by the docking station 100.

Figure 2:
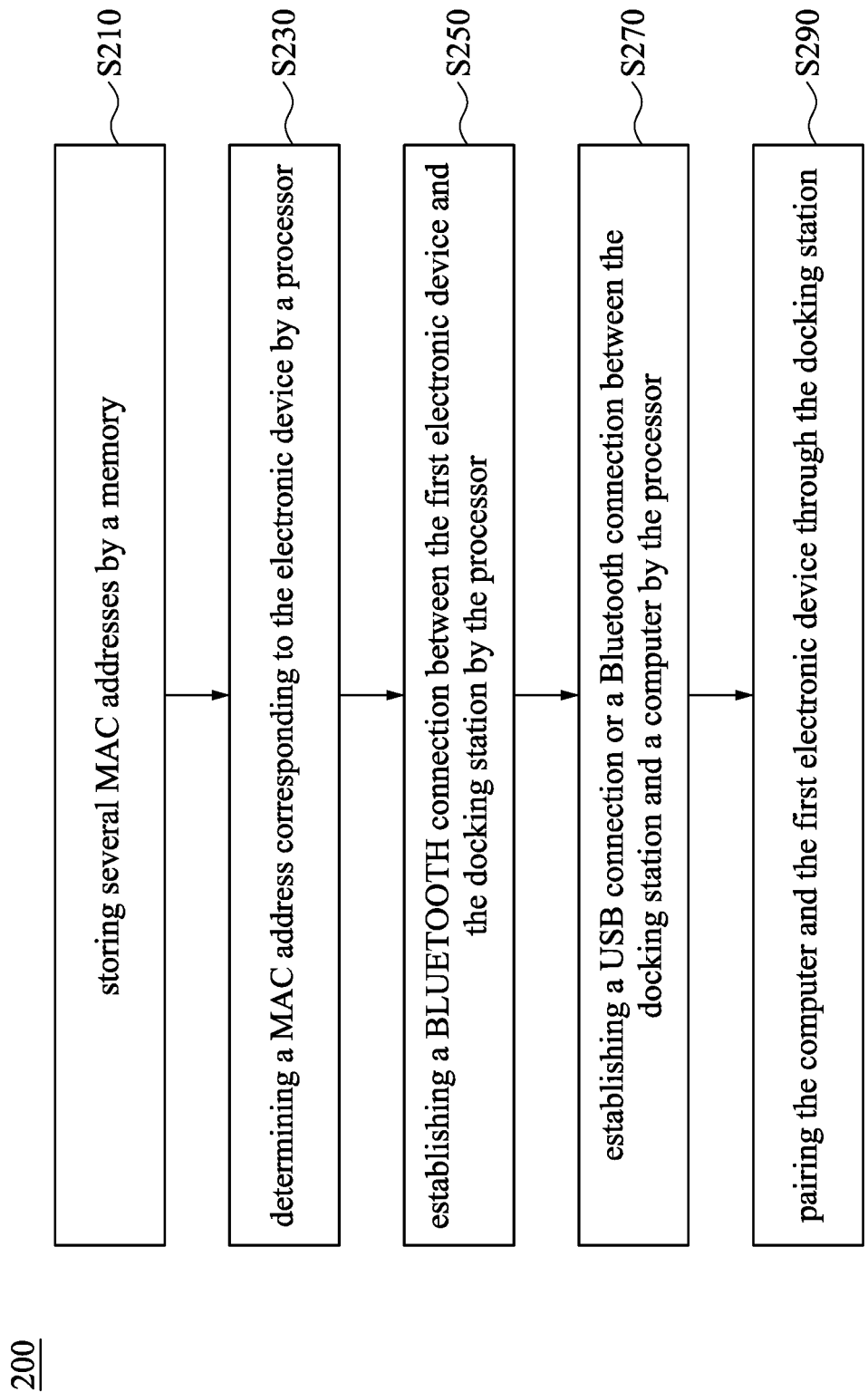
FIG. 2 is a flow chart illustrating a connecting method according to some embodiments of the present disclosure.

Reference is made to FIG. 2. FIG. 2 is a flow chart illustrating a connecting method 200 according to some embodiments of the present disclosure. The connecting method 200 includes operations S210-S290. For convenience of explanation and understanding, reference is made to FIG. 1 and FIG. 2.

In operation S210, storing several MAC addresses by a memory. For example, when the electronic device 700 is paired to the computer 900 by the first time, the computer 900 assigned a MAC address corresponding to the electronic device 700. The computer 900 sends the MAC address corresponding to the electronic device 700 to the docking station 100 through the communication circuit 112B, and the processor 114 stores the MAC address in the memory 116. If five different electronic devices have paired with the computer 900 before, then five different MAC addresses may be assigned, and the five different MAC addresses may be stored in the memory 116.

Figure 3:
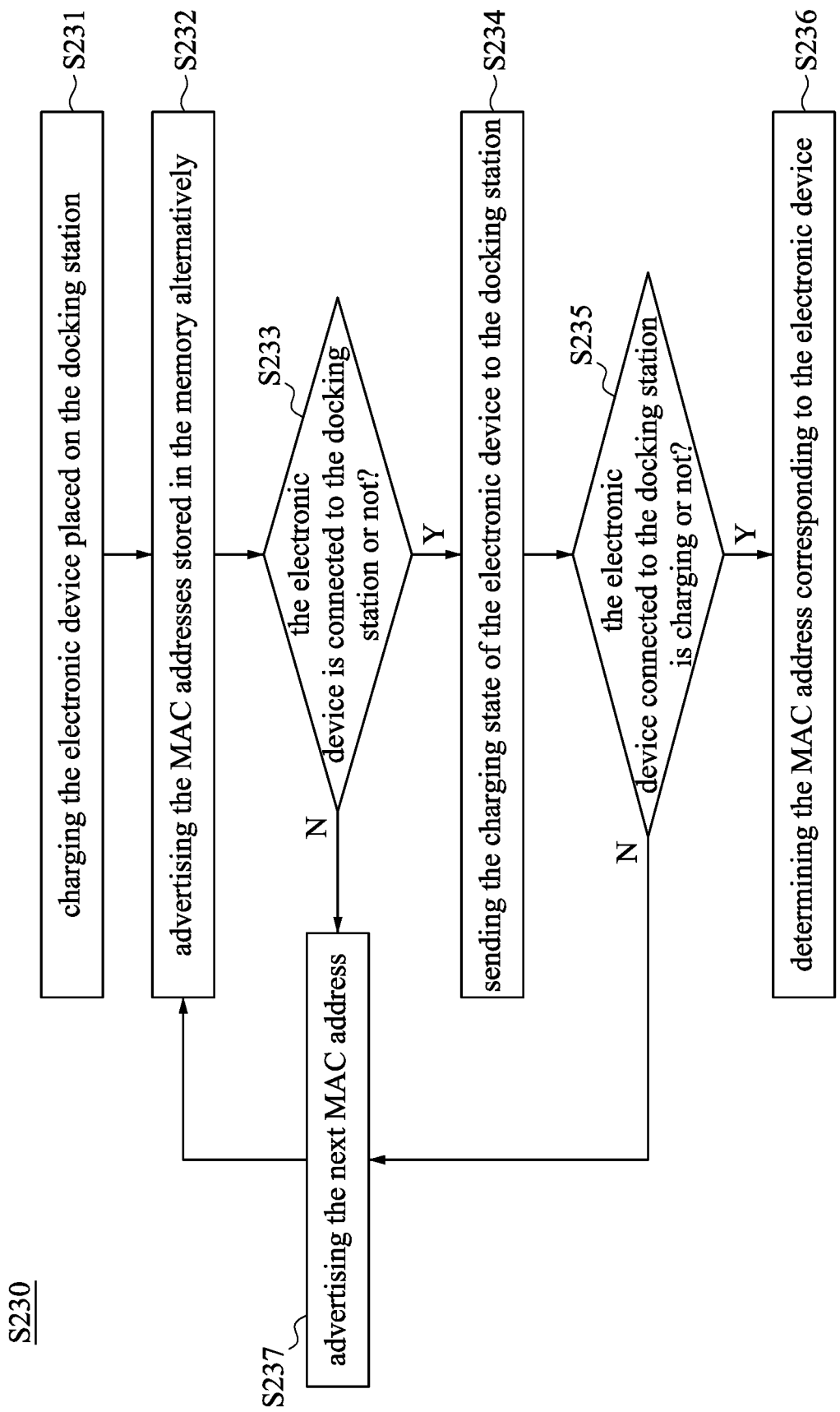
FIG. 3 is a flow chart illustrating an operation in FIG. 2 according to some other embodiments of the present disclosure.

In operation S230, determining a MAC address corresponding to the electronic device by a processor. In some embodiments, operation S230 may be performed as illustrated in FIG. 3. FIG. 3 is a flow chart illustrating the operation S230 in FIG. 2 according to some other embodiments of the present disclosure. In FIG. 3, operation S230 includes operations S231 to S237. For convenience of explanation and understanding, reference is made to FIG. 1 and FIG. 3.

In operation S231, charging the electronic device placed on the docking station. For example, when the electronic device 700 is placed on the docking station 100, the docking station 100 charges the electronic device 700 wirelessly.

In operation S232, advertising the MAC addresses stored in the memory alternatively. For example, the processor 114 starts advertising the first MAC address stored in the memory 116 when the electronic device 700 placed on the docking station 100 is being charged wirelessly by the docking station 100.

In operation S233, determining whether the electronic device is connected to the docking station or not. For example, when the first MAC address is advertised, the processor 114 determines whether the electronic device 700 is connected to the docking station 100 or not. If, the electronic device is connected to the docking station, operation S234 is performed. If the electronic device is not connected to the docking station, operation S237 is performed.

In operation S234, sending the charging state of the electronic device to the docking station. For example, when the electronic device 700 is connected to the docking station 100 in operation S233, electronic device 700 transmits the charging state of the electronic device 700 to the docking station 100 through the Bluetooth connection between the electronic device 700 and the docking station 100.

In operation S235, determining whether the electronic device connected to the docking station is charging or not. If the electronic device connected to the docking station is not charging, operation S237 is performed. If the electronic device connected to the docking station is charging, operation S236 is performed.

In operation S236, determining the MAC address corresponding to the electronic device. That is, the processor 114 determines that the MAC address being advertised and connected to the electronic device 700 is the MAC address corresponding to the electronic device 700.

In operation S237, advertising the next MAC address. For example, the docking station 100 stops advertising the first MAC address, and starts advertising the second MAC address stored in the memory 116.

In operation S250, establishing a BLUETOOTH connection between the first electronic device and the docking station by the processor. For example, the communication circuit 112A establishes a BLUETOOTH connection between the electronic device 700 and the docking station 100.

In operation S270, establishing a USB connection or Bluetooth connection between the docking station and a computer by the processor. For example, the communication circuit 112B establishes a USB connection or Bluetooth connection between the docking station 100 and a computer 900.

In operation S290, pairing the computer and the first electronic device through the docking station. For example, the computer 900 and the electronic device 700 are paired through the docking station 100, so that the computer 900 and the electronic device 700 may transmit data to each other through the WIFI connection between the computer 900 and the electronic device 700.

According to the embodiment of the present disclosure, it is understood that the embodiment of the present disclosure is to provide a docking station and a connecting method, since the MAC addresses corresponding to the electronic devices are stored in the memory, the connection between the docking station and the electronic device may be established faster, and further to establish the WIFI connection between the computer and the electronic devise faster. Furthermore, the docking station or the computer may further check whether the electronic device, which is connected to the docking station by now is charging wirelessly by the docking station, so as to assure that the found MAC address is in correspondence to the electronic device placed on the docking station, instead of other electronic devices which are placed near the docking station 100 and are not being charged wirelessly by the docking station.

The processor 114 may be a server, a circuit, a central processing unit, a central processing unit (CPU), a microprocessor (MCU), or other device having the function of storing, calculating, data reading, signal or information receiving, signal or information transmitting, or other equivalent functionality. In some embodiments of the present disclosure, the communication interface 112A, 112B may transmit information through a wired communication interface and/or a wireless communication interface. In some embodiments of the present disclosure, the memory 116 may be a circuit having the function of storing data or information. In some embodiments of the present disclosure, the wireless charging circuit 118 may be a circuit having the function of wireless charging. In some embodiments of the present disclosure, the electronic device 700 may be a hand phone, an iPod, an iPad, or any other electronic device.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A connecting method, comprising:
storing a plurality of MAC addresses by a memory of a docking station;

determining a first MAC address of the plurality of MAC addresses by a processor of the docking station, wherein the first MAC address is corresponding to a first electronic device of the plurality of electronic device;

establishing a first BLUETOOTH connection between the first electronic device and the docking station by the processor;

establishing a USB connection between the docking station and a computer by the processor, wherein the docking station is physically connected to the computer through the USB connection; and pairing the computer and the first electronic device through the docking station by using the first BLUETOOTH connection and the USB connection.

2. The connecting method of claim 1, further comprising:
charging the first electronic device wirelessly.

3. The connecting method of claim 1, further comprising:
advertising the plurality of MAC addresses alternatively.

4. The connecting method of claim 1, further comprising:
transmitting a WIFI IP of the computer and a WIFI IP of the electronic device through a first communication circuit and a second communication circuit, so as to establish a WIFI connection between the computer and the electronic device.

5. The connecting method of claim 1, further comprising:
transmitting a charging status of the first electronic device to the computer and the docking station.

6. The connecting method of claim 1, further comprising:
assigning the plurality of MAC addresses by the computer.

7. The connecting method of claim 3, further comprising:
determining whether the docking station is connected with the first electronic device through the first MAC address when the first MAC address is advertised.

8. The connecting method of claim 3, further comprising:
starting advertising the plurality of MAC addresses when a wireless charging circuit of the docking station is wirelessly charging one of the electronic devices.

9. The connecting method of claim 3, further comprising:
starting advertising the plurality of MAC addresses when a triggering message is transmitted from the computer to the docking station.

10. The connecting method of claim 7, further comprising:
determining whether the first electronic device is wirelessly charged by the docking station.

11. A docking station, comprising:
a memory configured to store a plurality of MAC addresses, wherein the plurality of MAC addresses correspond to a plurality of electronic device;
a processor configured to determine a first MAC address of the plurality of MAC addresses, wherein the first MAC address is corresponding to a first electronic device of the plurality of electronic devices;
a first communication circuit configured to establish a first BLUETOOTH connection between the first electronic device and the docking station; and
a second communication circuit physically connected to a computer through a USB connection, and the second communication circuit configured to establish the USB connection or a second Bluetooth connection between the docking station and the computer;
wherein the computer and the first electronic device are paired through the docking station by using the first BLUETOOTH connection and the USB connection.

12. The docking station of claim 11, further comprising:
a wireless charging circuit, wherein when the first electronic device is placed on the docking station, the wireless charging circuit charges the first electronic device wirelessly.

13. The docking station of claim 11, wherein the processor is further configured to advertise the plurality of MAC addresses alternatively.

14. The docking station of claim 11, wherein a WIFI IP of the computer and a WIFI IP of the electronic device is transmitted through the first communication circuit and the second communication circuit, so as to establish a WIFI connection between the computer and the electronic device.

15. The docking station of claim 11, wherein a charging status of the first electronic device is transmitted to the computer and the docking station through the first communication circuit and the second communication circuit.

16. The docking station of claim 11, wherein the plurality of MAC addresses are assigned by the computer.

17. The docking station of claim 13, wherein the processor is further configured to determine whether the docking station is connected with the first electronic device through the first MAC address when the first MAC address is advertised.

18. The docking station of claim 13, wherein the processor is further configured to start advertising the plurality of MAC addresses when a wireless charging circuit of the docking station is wirelessly charging one of the electronic devices.

19. The docking station of claim 13, wherein the processor is further configured to start advertising the plurality of MAC addresses when a triggering message is transmitted from the computer to the docking station.

20. The docking station of claim 17, wherein the processor is further configured to determine whether the first electronic device is wirelessly charged by the docking station.

* * * * *